United States Patent
Saito et al.

(10) Patent No.: US 9,084,311 B2
(45) Date of Patent: Jul. 14, 2015

(54) LIGHTING DEVICE

(71) Applicant: PANASONIC CORPORATION, Osaka (JP)

(72) Inventors: Takashi Saito, Osaka (JP); Toshihide Mori, Osaka (JP); Ayako Tsukitani, Kyoto (JP); Hiroshi Hamano, Hyogo (JP); Akira Takashima, Hyogo (JP); Kensuke Yamazoe, Osaka (JP); Kouichi Wada, Saitama (JP); Yoshinori Karasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 239 days.

(21) Appl. No.: 13/939,501

(22) Filed: Jul. 11, 2013

(65) Prior Publication Data

US 2014/0015444 A1 Jan. 16, 2014

(30) Foreign Application Priority Data

Jul. 13, 2012 (JP) .................................. 2012-157685
Sep. 14, 2012 (JP) .................................. 2012-202453

(51) Int. Cl.
*G05F 1/00* (2006.01)
*H05B 37/02* (2006.01)
*H05B 39/04* (2006.01)
*H05B 41/36* (2006.01)
*H05B 33/08* (2006.01)

(52) U.S. Cl.
CPC ........ *H05B 37/0227* (2013.01); *H05B 33/0857* (2013.01)

(58) Field of Classification Search
USPC ..................... 315/77, 297, 180, 280
See application file for complete search history.

(56) References Cited

U.S. PATENT DOCUMENTS

| | | | |
|---|---|---|---|
| 6,144,158 A | 11/2000 | Beam | |
| 2005/0243272 A1* | 11/2005 | Mainster et al. | 351/160 R |
| 2008/0077882 A1* | 3/2008 | Kramer et al. | 715/810 |
| 2009/0010494 A1* | 1/2009 | Bechtel et al. | 382/104 |
| 2011/0252678 A1* | 10/2011 | Jones et al. | 40/572 |
| 2012/0116632 A1* | 5/2012 | Bechtel et al. | 701/36 |
| 2014/0015444 A1* | 1/2014 | Saito et al. | 315/297 |
| 2014/0233805 A1* | 8/2014 | Faber et al. | 382/104 |
| 2015/0048736 A1* | 2/2015 | Foltin | 315/82 |

FOREIGN PATENT DOCUMENTS

| | | |
|---|---|---|
| CN | 101442855 | 5/2009 |
| CN | 202068616 | 12/2011 |
| JP | 2008-091232 | 4/2008 |

OTHER PUBLICATIONS

Abstract of "Fast reactive control for illumination through rain and snow", Computational Photography (ICCP), 2012 IEEE International Conference on Apr. 28-29, 2012.
China Office action, dated Dec. 24, 2014 along with an English translation thereof.

* cited by examiner

*Primary Examiner* — Adam Houston
(74) *Attorney, Agent, or Firm* — Greenblum & Bernstein, P.L.C.

(57) ABSTRACT

A lighting device includes a first light source having a first S/P ratio, a second light source having a second S/P ratio that is higher than the first S/P ratio, and a controller configured to performing dimming control of light output from the first and second light sources. The controller performs the dimming control separately on the first and second light sources at least under a snow covered condition.

12 Claims, 9 Drawing Sheets

| Combination No. | 1st Light Source | 2nd Light Source | Color Temperature [K] | Color Shift Duv | S/P Ratio | S/P Ratio ≥2 |
|---|---|---|---|---|---|---|
| 1 | A1 | B1 | 4970 | -3.6 | 2.33 | ○ |
| 2 | A1 | B2 | 5360 | -2.3 | 2.45 | ○ |
| 3 | A1 | B3 | 5530 | -4.2 | 2.53 | ○ |
| 4 | A1 | B4 | 4270 | -8.9 | 1.55 | × |
| 5 | A1 | B5 | 4410 | -11.7 | 1.64 | × |
| 6 | A1 | B6 | 5220 | -8.7 | 2.36 | ○ |
| 7 | A1 | B7 | 4780 | -15.8 | 1.76 | × |
| 8 | A2 | B1 | 5300 | -4.6 | 2.48 | ○ |
| 9 | A2 | B2 | 5770 | -3.2 | 2.61 | ○ |
| 10 | A2 | B3 | 5990 | -5 | 2.7 | ○ |
| 11 | A2 | B4 | 4500 | -11 | 1.74 | × |
| 12 | A2 | B5 | 4810 | -13.6 | 1.84 | × |
| 13 | A2 | B6 | 5680 | -9.7 | 2.55 | ○ |
| 14 | A2 | B7 | 5260 | -17.4 | 1.95 | × |
| 15 | A3 | B1 | 5640 | -2.4 | 2.49 | ○ |
| 16 | A3 | B2 | 6160 | -0.6 | 2.62 | ○ |
| 17 | A3 | B3 | 6420 | -2.1 | 2.71 | ○ |
| 18 | A3 | B4 | 4940 | -8.3 | 1.78 | × |
| 19 | A3 | B5 | 5280 | -10.5 | 1.88 | × |
| 20 | A3 | B6 | 6140 | -6.6 | 2.56 | ○ |
| 21 | A3 | B7 | 5800 | -13.8 | 1.99 | × |
| 22 | A4 | B1 | 6060 | 0.1 | 2.58 | ○ |
| 23 | A4 | B2 | 6680 | 2.3 | 2.72 | ○ |
| 24 | A4 | B3 | 7020 | 0.9 | 2.82 | ○ |
| 25 | A4 | B4 | 5410 | -5.7 | 1.87 | × |
| 26 | A4 | B5 | 5833 | -7.7 | 1.97 | × |
| 27 | A4 | B6 | 6750 | -3.6 | 2.67 | ○ |
| 28 | A4 | B7 | 6490 | -10.8 | 2.09 | ○ |

Combination No. 24

| Condition | Light Output of 1st Light Source | Light Output of 2nd Light Source | Color Temperature [K] | Color Shift Duv | S/P Ratio |
|---|---|---|---|---|---|
| Normal | 100% | 100% | 7020 | 0.9 | 2.82 |
| Slight Snow Cover | 100% | 75% | 6510 | 0.2 | 2.68 |
| Intermediate | 100% | 50% | 5880 | -0.5 | 2.48 |
| Snow Cover Advancing | 100% | 25% | 5090 | -0.8 | 2.18 |
| Snow Covered | 100% | 0% | 4070 | 0.8 | 1.68 |

Fig.18

Combination No. 17

| Condition | Light Output of 1st Light Source | Light Output of 2nd Light Source | Color Temperature [K] | Color Shift Duv | S/P Ratio |
|---|---|---|---|---|---|
| Normal | 100% | 100% | 6420 | -2.1 | 2.71 |
| Slight Snow Cover | 100% | 75% | 5900 | -3.1 | 2.56 |
| Intermediate | 100% | 50% | 5280 | -4 | 2.35 |
| Snow Cover Advancing | 100% | 25% | 4520 | -4.5 | 2.04 |
| Snow Covered | 100% | 0% | 4070 | 0.8 | 1.68 |

Fig.19

| Combination No. | 1st Light Source | 2nd Light Source | Color Temperature [K] | Color Shift Duv | S/P Ratio | S/P Ratio ≧2 |
|---|---|---|---|---|---|---|
| X1 | A1 | B1 | 4101 | -3.9 | 1.96 | × |
| X2 | A1 | B2 | 4266 | -3.5 | 2.03 | ○ |
| X3 | A1 | B3 | 4298 | -5.1 | 2.06 | ○ |
| X4 | A1 | B4 | 3551 | -5.6 | 1.38 | × |
| X5 | A1 | B5 | 3654 | -7.9 | 1.44 | × |
| X6 | A1 | B6 | 4095 | -7.6 | 1.94 | × |
| X7 | A1 | B7 | 3794 | -11.3 | 1.51 | × |
| X8 | A2 | B1 | 4440 | -6.3 | 2.18 | ○ |
| X9 | A2 | B2 | 4653 | -5.8 | 2.25 | ○ |
| X10 | A2 | B3 | 4712 | -7.4 | 2.3 | ○ |
| X11 | A2 | B4 | 3864 | -9.6 | 1.63 | × |
| X12 | A2 | B5 | 3997 | -11.7 | 1.69 | × |
| X13 | A2 | B6 | 4495 | -10.3 | 2.18 | ○ |
| X14 | A2 | B7 | 4181 | -14.7 | 1.77 | × |
| X15 | A3 | B1 | 4880 | -3.6 | 2.21 | ○ |
| X16 | A3 | B2 | 5132 | -2.8 | 2.28 | ○ |
| X17 | A3 | B3 | 5221 | -4.1 | 2.33 | ○ |
| X18 | A3 | B4 | 4352 | -6.9 | 1.69 | × |
| X19 | A3 | B5 | 4513 | -8.6 | 1.75 | × |
| X20 | A3 | B6 | 5018 | -7 | 2.22 | ○ |
| X21 | A3 | B7 | 4737 | -11.3 | 1.82 | × |
| X22 | A4 | B1 | 5360 | -0.6 | 2.32 | ○ |
| X23 | A4 | B2 | 5686 | 0.7 | 2.41 | ○ |
| X24 | A4 | B3 | 5825 | -0.5 | 2.46 | ○ |
| X25 | A4 | B4 | 4849 | -4 | 1.8 | × |
| X26 | A4 | B5 | 5061 | -5.6 | 1.86 | × |
| X27 | A4 | B6 | 5618 | -3.6 | 2.35 | ○ |
| X28 | A4 | B7 | 5358 | -8.1 | 1.94 | × |

Fig.20

Combination No. 24

| Condition | Light Output of 1st Light Source | Light Output of 2nd Light Source | Color Temperature [K] | Color Shift Duv | S/P Ratio |
|---|---|---|---|---|---|
| Normal | 100% | 100% | 5825 | -0.5 | 2.46 |
| Slight Snow Cover | 100% | 75% | 5459 | -0.8 | 2.33 |
| Intermediate | 100% | 50% | 5050 | -0.8 | 2.17 |
| Snow Cover Advancing | 100% | 25% | 4589 | -0.5 | 1.96 |
| Snow Covered | 100% | 0% | 4070 | 0.8 | 1.68 |

Fig.21

Combination No. 17

| Condition | Light Output of 1st Light Source | Light Output of 2nd Light Source | Color Temperature [K] | Color Shift Duv | S/P Ratio |
|---|---|---|---|---|---|
| Normal | 100% | 100% | 5221 | -4.1 | 2.33 |
| Slight Snow Cover | 100% | 75% | 4869 | -4.4 | 2.19 |
| Intermediate | 100% | 50% | 4482 | -4.4 | 2.03 |
| Snow Cover Advancing | 100% | 25% | 4059 | -3.9 | 1.81 |
| Snow Covered | 100% | 0% | 4070 | 0.8 | 1.68 |

US 9,084,311 B2

LIGHTING DEVICE

CROSS-REFERENCE TO RELATED APPLICATIONS

This application is based upon and claims the benefit of priority from prior Japanese Patent Application No. 2012-157685, filed on Jul. 13, 2012 and prior Japanese Patent Application No. 2012-202453, filed on Sep. 14, 2012, the entire contents of which are incorporated herein by reference.

BACKGROUND ART

The present invention relates to a lighting device.

Lighting devices, such as fluorescent lamps and light emitting diodes (LED elements), are generally designed to increase photopic luminance under well-lit conditions (photopic vision). This allows for cones, which perceive brightness with photopic vision, to function. A higher photopic luminance allows for humans to perceive light as being brighter.

However, when humans use mesopic vision under a situation such as on a street lit by lampposts during the nighttime, rods function in addition to cones. Cones have a spectral luminous efficiency with a peak wavelength at 555 nm, and rods have a spectral luminous efficiency with a peak wavelength at 507 nm. Thus, an increase in only the photopic luminance would have a low effect. Such a shift of the spectral luminous efficiency is known as the Purkinje effect.

Japanese Laid-Open Patent Publication No. 2008-91232 describes an example of a lighting device including a plurality of light sources so that the cones and the rods in the retina are both effective when using mesopic vision. At least one of the light sources is formed to have a peak wavelength between 450 to 550 nm. This light source has a wavelength range that includes 507 nm, which is the peak wavelength for the spectral luminous efficiency of the rods.

The lighting device of Japanese Laid-Open Patent Publication No. 2008-91232 improves vision under mesopic conditions by coping with the Purkinje effect. However, for example, when the snow cover is present on a road, the surface of the road becomes more whitish than when there is no snow. This changes the reflectivity of the road surface. As a result, the Purkinje effect may not occur. In such a case, the lighting device of Japanese Laid-Open Patent Publication No. 2008-91232 would not improve vision because the Purkinje effect does not occur.

Further, the lighting device designed to cope with the Purkinje effect emits bluish light due to the relatively large number of short wavelength components included in the light. Accordingly, there is still room for improvement in vision with the lighting device that is designed to cope with the Purkinje effect.

SUMMARY OF THE INVENTION

One aspect of the present invention is a lighting device including a first light source having a first S/P ratio, a second light source having a second S/P ratio that is higher than the first S/P ratio, and a controller configured to perform dimming control of light output of the first light source and the second light source. The controller performs the dimming control of light output of the second light source independently of the first light source at least under a snow covered condition.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A lighting device 10 according to one embodiment of the present invention will now be described with reference to the drawings.

Figure 1:
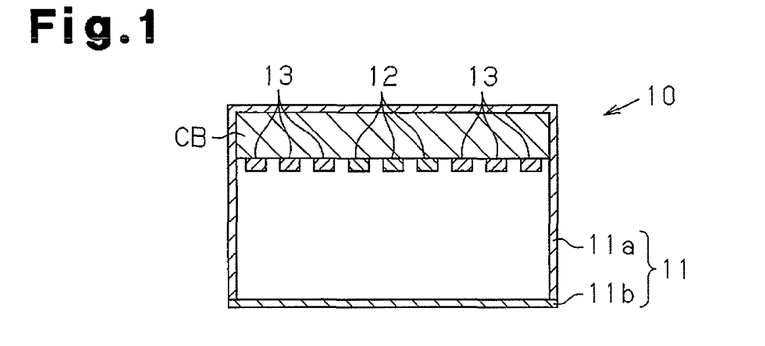
FIG. 1 is a schematic cross-sectional view showing one embodiment of a lighting device.

Referring to FIG. 1, the lighting device 10 of the present embodiment includes a casing 11, a plurality of first light sources 12, and a plurality of second light sources 13. The first light sources 12 and the second light sources 13 are arranged in the casing 11.

The casing 11 includes a casing body 11a, which is tubular and has a closed end, and a transparent plate 11b, which closes the open end of the casing body 11a and transmits light. A flat base CB is set on the closed end of the casing body 11a. The first light sources 12 and the second light sources 13 are arranged on the base CB. The transparent plate 11b includes a diffusion filter to increase the diffuseness of light.

As shown in FIG. 1, the first light sources 12 are arranged at the central section of the base CB. The second light sources 13 are dispersed around the first light sources 12 in the peripheral section of the base CB. The first light sources 12 have a lower color temperature than the second light sources 13. The first light sources 12 have a first ratio of scotopic to photopic (hereinafter, referred to as "first S/P ratio). The second light sources 13 have a second ratio of scotopic to photopic ((hereinafter, referred to as "second S/P ratio"), which is higher than the first S/P ratio of the first light sources 12. The S/P ratio refers to the ratio of scotopic luminance Ls to photopic luminance Lp. The scotopic vision Ls is calculated by integrating the scotopic spectral luminous efficiency V'(λ) with the spectral characteristic of the lamp. The photopic vision Lp is calculated by integrating the photopic spectral luminous efficiency V(λ) with the spectral characteristic of the lamp.

Figure 2:
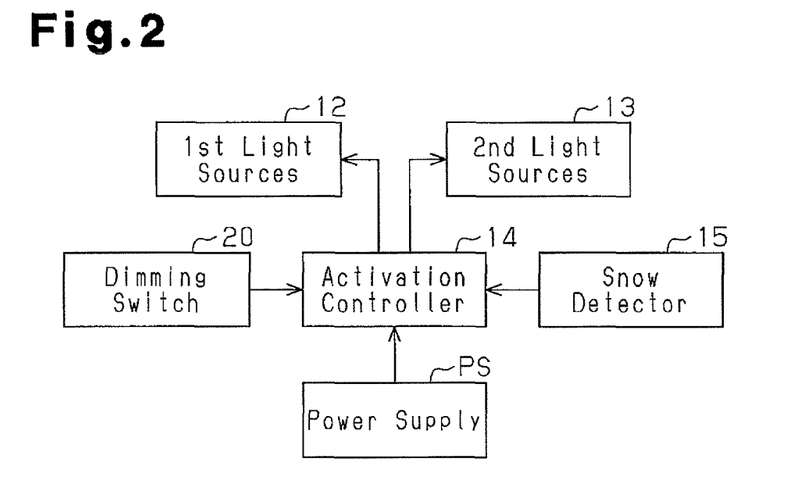
FIG. 2 is a schematic block diagram showing the structure of the lighting device of FIG. 1.

Referring to FIG. 2, the lighting device 10 of the present embodiment includes an activation controller 14 that controls the first and second light sources 12 and 13. The activation controller 14 is supplied with power from a power supply PS. The activation controller 14 supplies the first and second light sources 12 and 13 with a certain amount of power. When the subject of illumination is an asphalt road surface, under normal conditions such as when there is no snow, the activation controller 14 controls the light output of the second light sources 13 to be greater than that of the first light sources 12 by 2.4 to 2.6 times, and preferably, approximately 2.5 times.

As shown in FIG. 2, the activation controller 14 is electrically connected to a snow detector 15 that detects the present of the snow cover. When detecting the present of the snow cover, the snow detector 15 provides the activation controller 14 with a signal indicating the detection. The snow detector 15 includes one of, for example, a brightness sensor, an image sensor, and an infrared sensor. For example, when the snow detector 15 includes a brightness sensor (illuminance sensor or brightness sensor), the snow detector 15 determines whether or not the snow cover is present from the difference in the illuminance or brightness of the area detected by the brightness sensor under normal conditions (no snow) and under snow covered conditions. When the snow detector 15 includes an image sensor, the snow detector 15 determines whether or not the snow cover is present from the difference in the color of the asphalt road surface or the like under normal conditions (no snow) and under snow covered conditions. When the snow detector 15 includes an infrared sensor, the snow detector 15 measures the distance from the lighting device 10 (snow detector 15) to the road surface and determines whether or not the snow cover is present from the difference in the distance under normal conditions (no snow) and under snow covered conditions. The snow detector 15 detects the present of the snow cover in an area conforming to the area illuminated by the light of the lighting device 10.

The inventors of the present invention have conducted tests changing conditions for the first and second light sources 12 and 13 of the lighting device 10 to check the S/P ratio and the Duv, which represents the color shift (deviation from block body locus).

Examples of conditions for the first and second light sources 12 and 13 observed by the inventors of the present invention are listed below.

Figure 3:
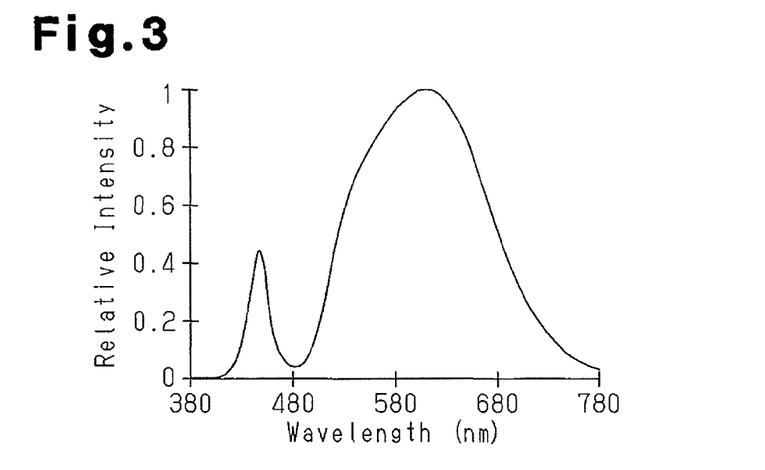
FIG. 3 is a spectral characteristic diagram of a first light source under condition A1.
Figure 4:
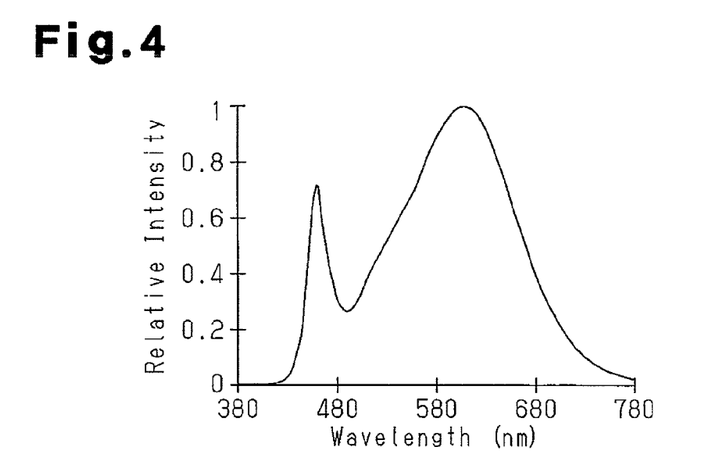
FIG. 4 is a spectral characteristic diagram of the first light source under condition A2.
Figure 5:
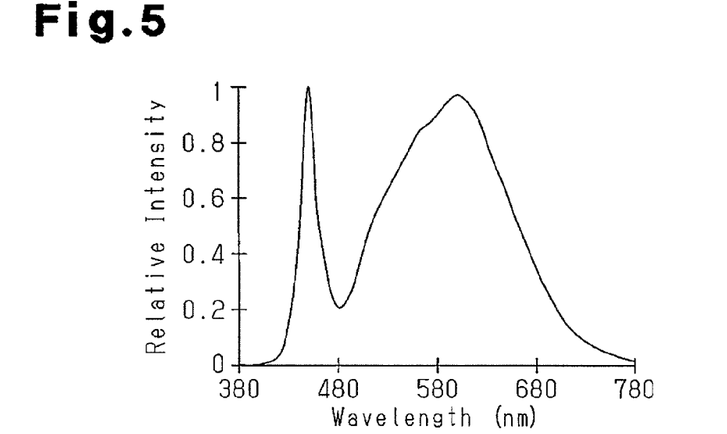
FIG. 5 is a spectral characteristic diagram of the first light source under condition A3.
Figure 6:
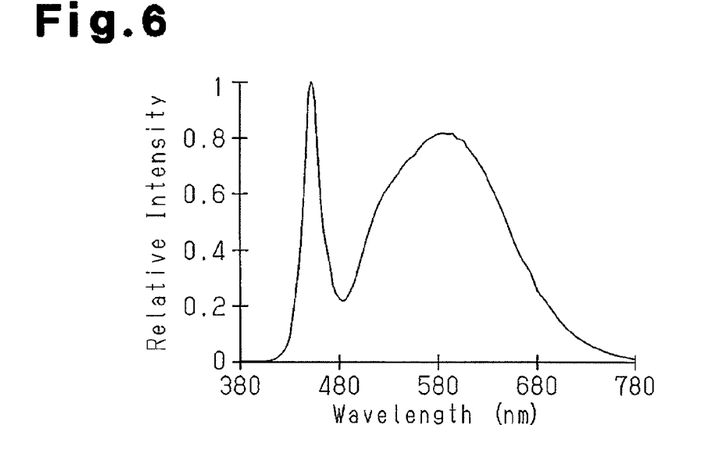
FIG. 6 is a spectral characteristic diagram of the first light source under condition A4.
Figure 7:
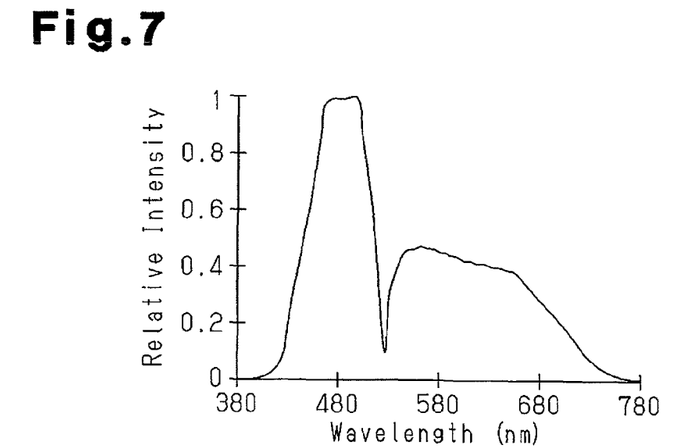
FIG. 7 is a spectral characteristic diagram of a second light source under condition B1.
Figure 8:
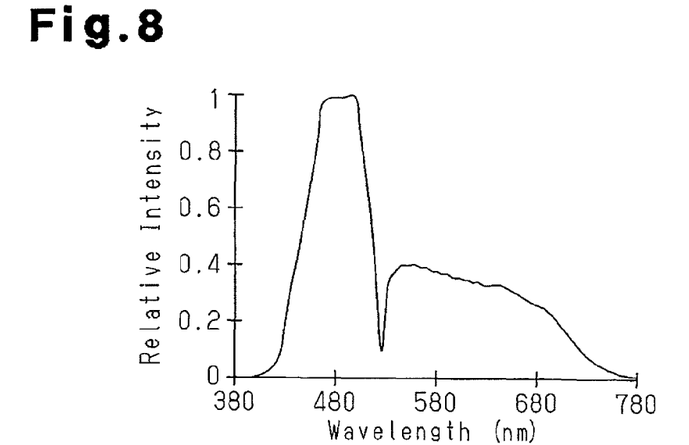
FIG. 8 is a spectral characteristic diagram of the second light source under condition B2.
Figure 9:
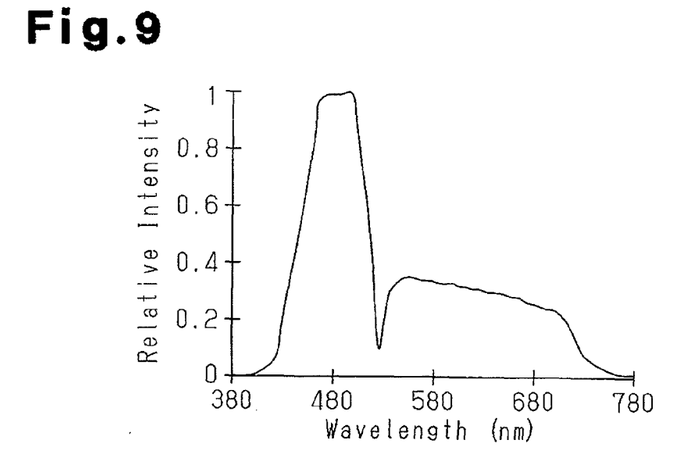
FIG. 9 is a spectral characteristic diagram of the second light source under condition B3.
Figure 10:
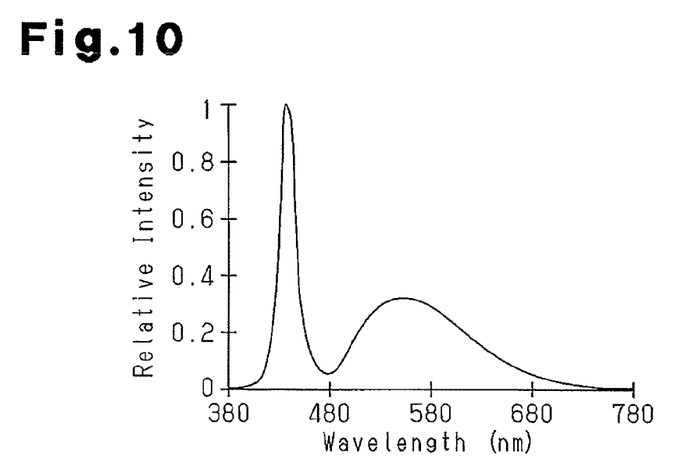
FIG. 10 is a spectral characteristic diagram of the second light source under condition B4.
Figure 11:
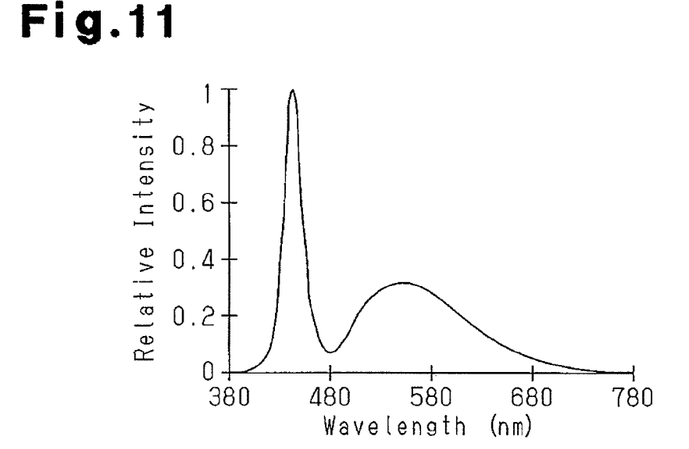
FIG. 11 is a spectral characteristic diagram of the second light source under condition B5.
Figure 12:
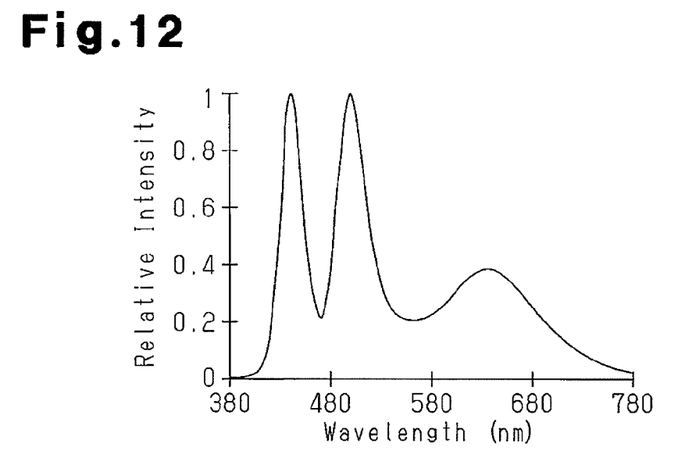
FIG. 12 is a spectral characteristic diagram of the second light source under condition B6.
Figure 13:
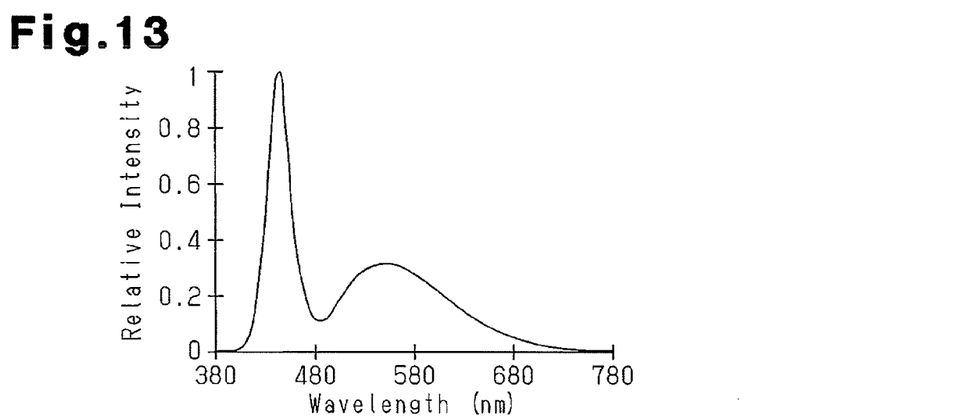
FIG. 13 is a spectral characteristic diagram of the second light source under condition B7.

Condition A1
The first light source 12 had the spectral characteristic shown in FIG. 3, the correlated color temperature was 2830 K, and the S/P ratio was 1.08.
Condition A2
The first light source 12 had the spectral characteristic shown in FIG. 4, the correlated color temperature was 3080 K, and the S/P ratio was 1.44.
Condition A3
The first light source 12 had the spectral characteristic shown in FIG. 5, the correlated color temperature was 3600 K, and the S/P ratio was 1.53.
Condition A4
The first light source 12 had the spectral characteristic shown in FIG. 6, the correlated color temperature was 4070 K, and the S/P ratio was 1.68.
Condition B1
The second light source 13 had the spectral characteristic shown in FIG. 7, the correlated color temperature was 8000 K, and the S/P ratio was 3.11.
Condition B2
The second light source 13 had the spectral characteristic shown in FIG. 8, the correlated color temperature was 10000 K, and the S/P ratio was 3.40.
Condition B3
The second light source 13 had the spectral characteristic shown in FIG. 9, the correlated color temperature was 11900 K, and the S/P ratio was 3.63.
Condition B4
The second light source 13 had the spectral characteristic shown in FIG. 10, the correlated color temperature was 7920 K, and the S/P ratio was 2.07.
Condition B5
The second light source 13 had the spectral characteristic shown in FIG. 11, the correlated color temperature was 10000 K, and the S/P ratio was 2.28.
Condition B6
The second light source 13 had the spectral characteristic shown in FIG. 12, the correlated color temperature was 12000 K, and the S/P ratio was 3.46.
Condition B7
The second light source 13 had the spectral characteristic shown in FIG. 12, the correlated color temperature was 15200 K, and the S/P ratio was 2.52.

The inventors combined a first light source 12 of one of the four conditions A1 to A4 with a second light source 13 of one of the seven conditions B1 to B7. The S/P ratio and color shift Duv for each of the combinations (twenty eight in total) were calculated (refer to FIG. 14).

Figure 14:
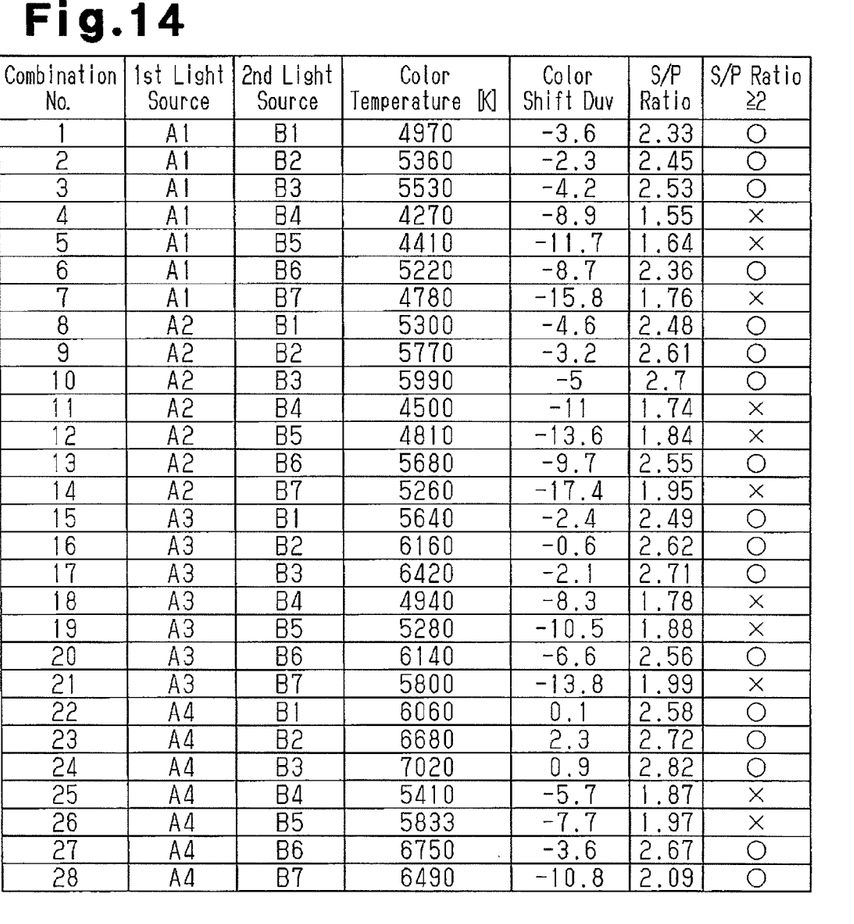
FIG. 14 is a table showing the color shift and S/P ratio obtained by the first and second light sources under each condition.

As shown in FIG. 14, in each of the combinations, the color shift Duv was in the range from 20 to −20 and the S/P ratio was 1.5 or greater. In combination Nos. 1 to 4, 6, 8 to 10, 13, 15 to 18, 20, and 22 to 27, the color shift Duv was in the range from 10 to −10. Further, in combination Nos. 1 to 3, 6, 8 to 10, 13, 15 to 17, 20, 22 to 24, 27, and 28, the S/P ratio was 2.0 or greater.

An example of the operation of the lighting device 10 will now be described.

When the present of the snow cover is not detected by the snow detector 15, the activation controller 14 of the lighting device 10, which is supplied with power from the power supply PS, supplies current to and activates the first and second light sources 12 and 13. When the present of the snow cover is detected by the snow detector 15, the activation controller 14 deactivates the second light sources 13 and activates only the first light sources 12. As indicated by conditions A1 to A4, the first light sources 12 emit relatively warm light having a correlated color temperature of 4150 K or less.

The light output of the second light sources 13 when there is no snow is greater than that of the first light sources by 2.4 to 2.6 times, preferably, by 2.5 times. Here, the reflectivity of an asphalt road surface is approximately 20%, and the reflectivity of snow on a road is approximately 70%. That is, when the snow cover is present on a road, the reflectivity observed by a human is approximately 3.5 times greater than that when there is no snow on the road. Accordingly, when the snow cover is present, the second light sources 13 may be deactivated and only the first light sources 12 may be activated. In this case, the lighting device 10 would generate a light output that is approximately 1/3.5 of the light output generated when there is no snow. However, a pedestrian or the like would perceive the light as having a brightness that is about the same as that when the first and second light sources 12 and 13 are all activated under the non-snow covered condition. Taking into consideration wear and paving errors of a road, the light output of the second light sources 13 is set to be 2.4 to 2.6 times greater than the light output of the first light sources 12.

The advantages of the present embodiment will now be described.

(1) The lighting device 10 includes the first light sources 12, the second light sources 13 having a higher S/P ratio than the first light sources 12, and the activation controller 14 that controls dimming of the second light sources 13 separately from the first light sources 12 at least when the snow cover is present. This allows for light having a high S/P ratio to be emitted from the first and second light sources 12 and 13 when there is no snow. Further, when the snow cover is present, dimming control is performed to deactivate the second light sources 13 that have a high S/P ratio. This allows for light having a relatively low S/P ratio to be emitted from the first light source 12. The first light sources 12 with a low S/P ratio have a lower color temperature than the second light sources 13. Accordingly, the lighting device 10 emits warm light when the snow cover is present and improves vision.

(2) The activation controller 14 controls the light output of the second light source 13 to be greater than that of the first light sources 12 when there is no snow. Compared to the reflectivity of an asphalt or concrete road surface when there is no snow (approximately 20% to 30%), the road surface reflectivity is two times or greater when the snow cover is present (approximately 70%). Thus, the light emitted when there is no snow by the lighting device 10 that activates the first and second light sources 12 and 13 may be perceived by a human as having the same brightness as the light emitted when the snow cover is present by the lighting device 10 that deactivates the second light sources 13 and activates only the first light sources 12.

(3) The combined light of the first light sources 12 and the second light sources 13 have an S/P ratio of 2.0 or greater. This improves vision under mesopic conditions when there is no snow.

(4) The lighting device 10 includes the light detector 15 that detects whether or not the snow cover is present. When the snow detector 15 detects the present of the snow cover, the activation controller 14 performs dimming control that deactivates the second light sources 13. This allows for automatic deactivation of the second light sources 13 when the present of the snow cover is detected. Further, when the snow detector 15 detects no snow, the activation controller 14 allows for activation of the second light sources 13.

(5) When the light color of the first light sources 12 is less than or equal to the center value 4150 K of the white color (3800 to 4500 K) as specified by JIS 29112, the first light sources 12 emit warm light.

It should be apparent to those skilled in the art that the present invention may be embodied in many other specific forms without departing from the spirit or scope of the invention. Particularly, it should be understood that the present invention may be embodied in the following forms.

In the above embodiment, the activation controller 14 deactivates the second light sources 13 when the snow cover is present. Instead, the activation controller 14 may dim the light emitted by the second light sources 13.

Figure 17:
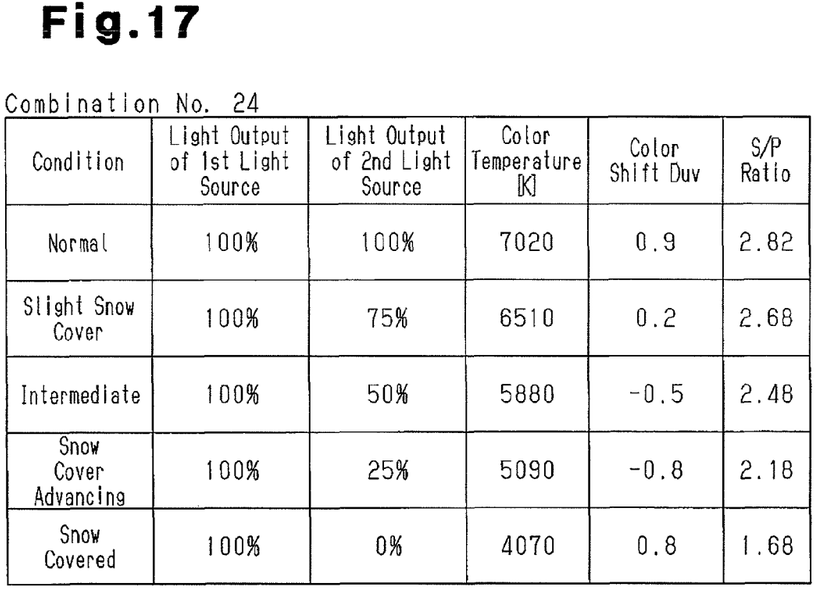
FIG. 17 is a table showing the control executed by a further example of the lighting device.
Figure 18:
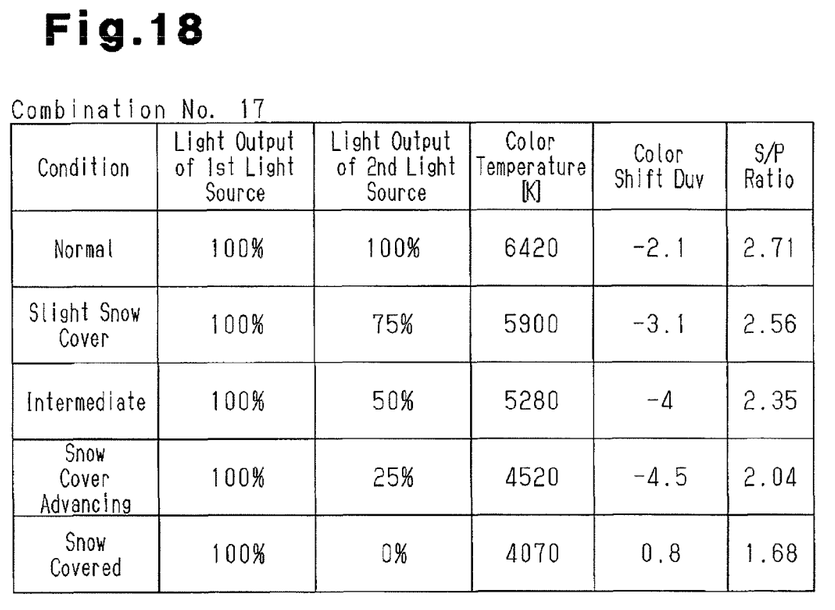
FIG. 18 is a table showing the control executed by another example of the lighting device

When the activation controller 14 dims the light emitted by the lighting device 10 during the present of the snow cover, the snow detector 15 may detect the amount of the snow cover, and the activation controller 14 may dim the light of the second light sources 13 as the amount of the snow cover increases. Examples of such a control will now be described with reference to FIGS. 17 and 18. FIG. 17 shows an example of the control performed when using the first and second light sources 12 and 13 of combination No. 24 in FIG. 14. FIG. 18 shows an example of the control performed when using the first and second light sources 12 and 13 of combination No. 14 in FIG. 14.

Referring to FIGS. 17 and 18, the road surface condition when there is no snow is categorized as a "normal" condition, and the road surface condition when the snow cover is present is categorized into the four stages of "slight snow cover," "intermediate," "snow cover advancing," and "snow covered."

The activation controller 14 activates the first light sources 12 so that the light output is 100% regardless of the road surface condition. As shown in FIGS. 17 and 18, under a "slight snow cover" condition, the activation controller 14 activates the second light sources 13 so that the light output is 75%. Under an "intermediate" condition, the activation controller 14 activates the second light sources 13 so that the light output is 50%. Under a "snow cover advancing" condition, the activation controller 14 activates the second light sources 13 so that the light output is 25%. When the first and second light sources 12 and 13 are both activated, the S/P ratio is preferably 2 or greater as shown in FIGS. 17 and 18. Under a "snow covered" condition, the light output of the second light sources 13 is 0%. That is, the second light sources 13 are deactivated.

In this manner, by dimming the light of the second light sources 13 in steps in accordance with the amount of the snow cover on the road surface (degree of the snow cover), light may be emitted further properly in accordance with the road surface.

In the above embodiment, the snow detector 15 detects the present of the snow cover in an area conforming to the area illuminated by the light of the lighting device 10. Instead, the lighting device 10 may detect the present of the snow cover in an area outside the area illuminated by the light of the lighting device 10.

In the above embodiment, as shown in FIG. 2, a dimming switch 20 operable by a user may be arranged on the lighting device 10, and the dimming switch 20 may be used to perform dimming control that activates or dims the second lighting sources 13.

In the above embodiment, the first light sources 12 have the spectral characteristics shown in FIGS. 3 to 6, and the second light sources 13 have the light sources shown in FIGS. 7 to 13. However, as long as the S/P ratio of the first light sources is less than the S/P ratio of the second light sources, the spectral characteristics of the first and second light sources 12 and 13 may be changed.

Figure 15:
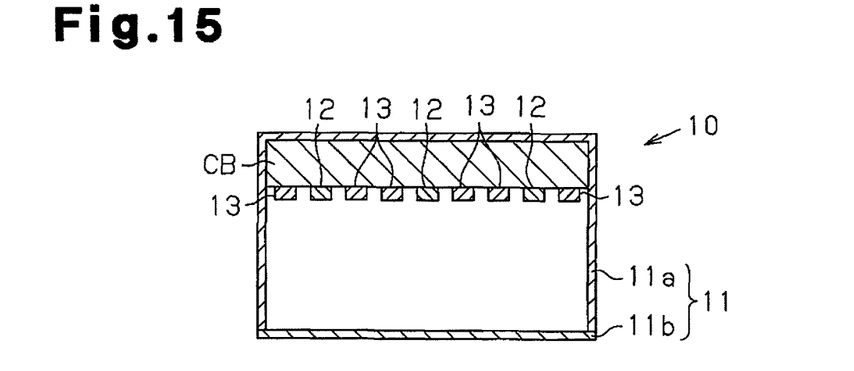
FIG. 15 is a schematic cross-sectional view showing another example of a lighting device.

In the above embodiment, the first light sources 12 are arranged in the central section of the flat base CB, and the second light sources 13 are arranged around the first light sources 12. Instead, the first and second light sources 12 and 13 may be arranged randomly as shown in FIG. 15.

Figure 16:
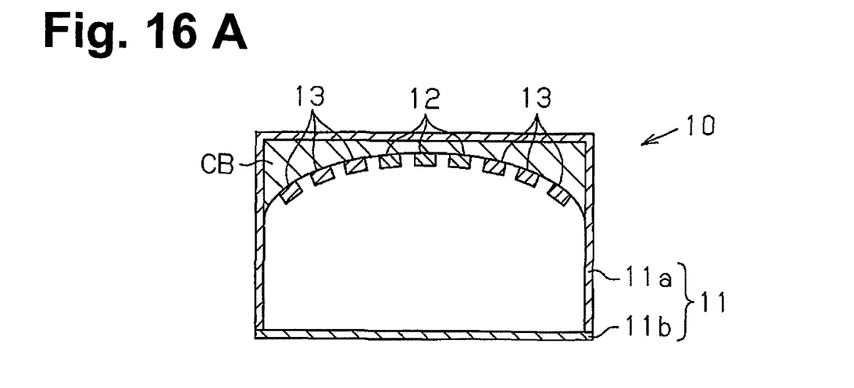
FIGS. 16A and 16B are schematic cross-sectional views showing other examples of a lighting device.

In the above embodiment, the first and second light sources 12 and 13 are arranged on the flat base CB. Instead, for example, as shown in FIGS. 16A and 16B, the base CB may have a curved surface, and the first and second light sources 12 and 13 may be arranged along the curved surface.

In the above embodiment, there are, for example, three first light sources 12 and six second light sources 13. However, the number of the first and second light sources 12 and 13 may be changed.

In the above embodiment, the light output ratio of the first and second light sources 12 and 13 are set based on an asphalt road surface. Instead, the light output ratio of the first and second light sources 12 and 13 may be set based on a road surface of concrete or other materials.

One example of the light output ratio based on concrete will now be described.

The reflectivity of a concrete road surface is approximately 31%, and the reflectivity of snow on a road is approximately 70%. That is, when the snow cover is present on a road, the reflectivity observed by a human is approximately 2.2 times greater than that when there is no snow on the road. Thus, under a normal situation in which there is no snow, the activation controller 14 controls the light output of the second light sources 13 to be 1.1 to 1.3 times greater than the light output of the first light sources 12. Accordingly, when the snow cover is present, the activation controller 14 deactivates the second light sources 13 and activates only the first light sources 12 so that the light output of the lighting device 10 is 1/2.2. Nevertheless, a pedestrian or the like would perceive the light as having a brightness that is about the same as that when there is no snow. Taking into consideration wear and paving errors of a road, the light output of the second light sources 13 is set to be 1.1 to 1.3 times greater than the light output of the first light sources 12.

The inventors of the present invention combined a first light source 12 of one of conditions A1 to A4 with a second light source 13 of one of the seven conditions B1 to B7 and calculated the S/P ratio and color shift Duv for each of the combinations.

Figure 19:
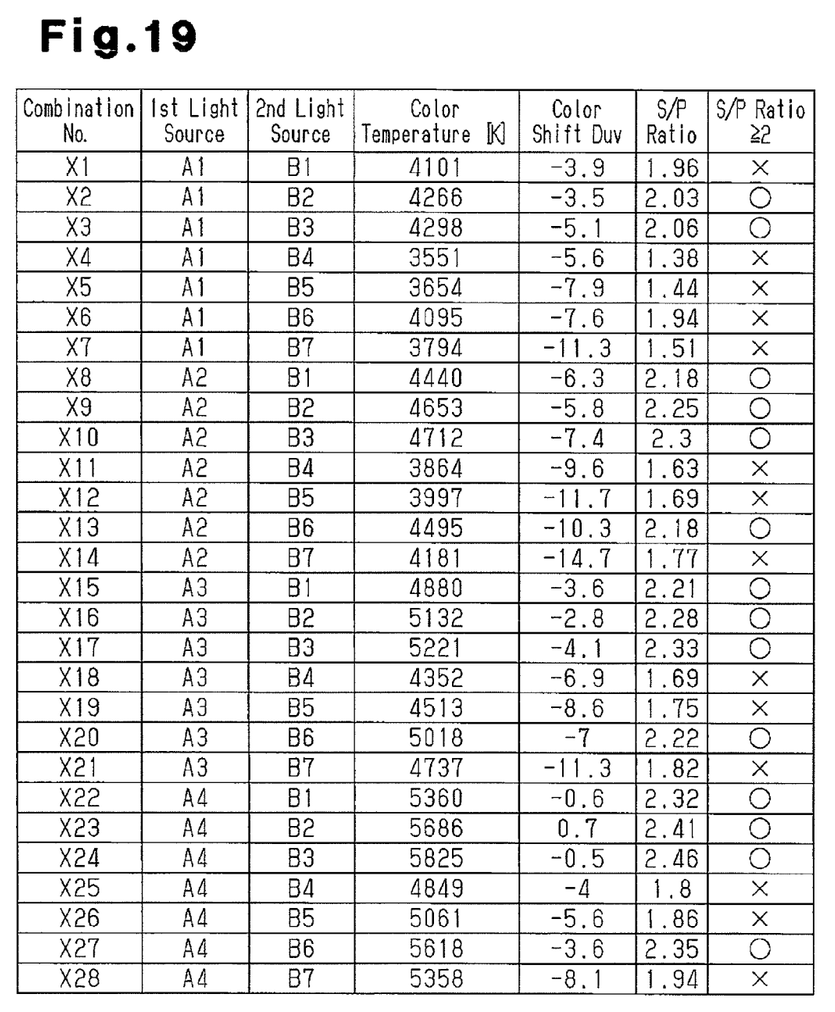
FIG. 19 is a table showing the color shift and S/P ratio obtained by the first and second light sources under each condition.

As shown in FIG. 19, in each of the combinations, the color shift Duv was in the range from 15 to −15 and the S/P ratio was 1.5 or greater. In combination Nos. X1 to X6, X8 to X11, X15 to X20, and X22 to X28, the color shift Duv was in the range from 10 to −10. Further, in combination Nos. X2, X3, X8 to X10, X13, X15 to X17, X20, X22 to X24, and X27, the S/P ratio was 2.0 or greater.

Figure 20:
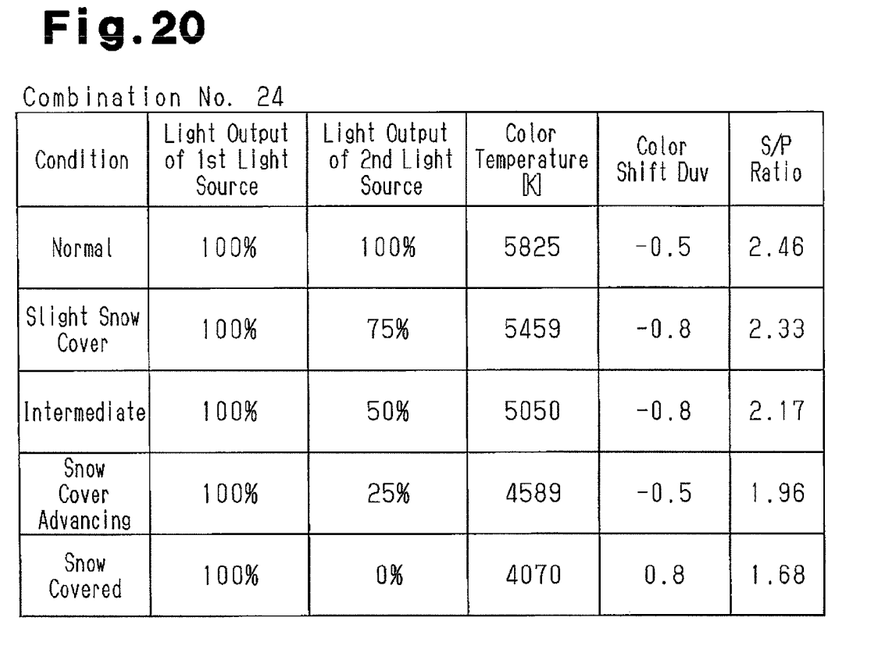
FIG. 20 is a table showing the control executed by a further example of the lighting device.
Figure 21:
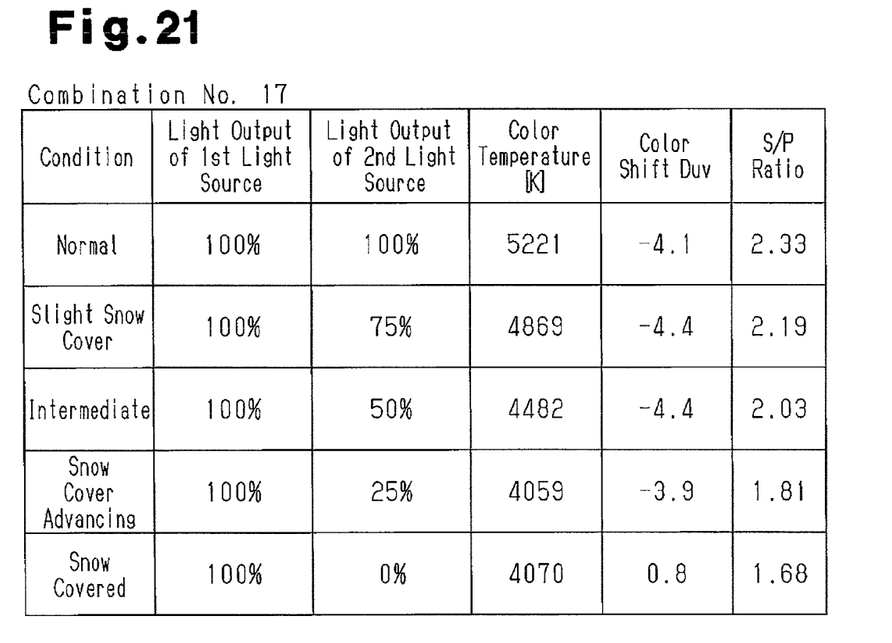
FIG. 21 is table showing the control executed by another example of the lighting device.

When the activation controller 14 dims the light emitted by the lighting device 10 during the present of the snow cover based on concrete, the snow detector 15 may detect the amount of the snow cover, and the activation controller 14 may dim the light of the second light sources 13 as the amount of the snow cover increases. Examples of such a control will now be described with reference to FIGS. 20 and 21. FIG. 20 shows an example of the control performed when using the first and second light sources 12 and 13 of combination No. X24 in FIG. 19. FIG. 21 shows an example of the control performed when using the first and second light sources 12 and 13 of combination No. X17 in FIG. 19.

Referring to FIGS. 20 and 21, the road surface condition when there is no snow is categorized as a "normal" condition, and the road surface condition when the snow cover is present is categorized into the four stages of "slight snow cover," "intermediate," "snow cover advancing," and "snow covered."

The activation controller 14 activates the first light sources 12 so that the light output is 100% regardless of the road surface condition. As shown in FIGS. 20 and 21, under a "slight snow cover" condition, the activation controller 14 activates the second light sources 13 so that the light output is 75%. Under an "intermediate" condition, the activation controller 14 activates the second light sources 13 so that the light output is 50%. Under a "snow cover advancing" condition, the activation controller 14 activates the second light sources 13 so that the light output is 25%. When the first and second light sources 12 and 13 are both activated, the S/P ratio is preferably 2 or greater as shown in FIGS. 20 and 21. Under a "snow covered" condition, the light output of the second light sources 13 is 0%. That is, the second light sources 13 are deactivated.

In this manner, by dimming the light of the second light sources 13 in steps in accordance with the amount of the snow cover on the road surface (degree of the snow cover), light may be emitted further properly in accordance with the road surface.

In the above embodiment, for example, the lighting device 10 may be configured so that when a user selects the road surface type (asphalt or concrete), the light output of the first and second light sources 12 and 13 are automatically set in accordance with the selection. The lighting device 10 may also be configured to automatically select the road surface type from the reflectivity of the road surface when there is no snow, and automatically set the light output of the first and second light sources 12 and 13.

In the above embodiment, the transparent plate 11b includes a diffusion filter. However, the diffusion filter may be omitted. Further, ridges and valley may be formed in the surface transparent plate 11b to diffuse light.

The present examples and embodiments are to be considered as illustrative and not restrictive, and the invention is not to be limited to the details given herein, but may be modified within the scope and equivalence of the appended claims.

The invention claimed is:

1. A lighting device comprising:
   a first light source having a first S/P ratio;
   a second light source having a second S/P ratio that is higher than the first S/P ratio; and
   a controller configured to perform dimming control of light output of the first light source and the second light source, wherein the controller performs the dimming control of light output of the second light source independently of the first light source at least under a snow covered condition.

2. The lighting device according to claim 1, wherein under a non-snow covered condition, the controller controls the light output of the second light source to be greater than that of the first light source.

3. The lighting device according to claim 2, wherein under the non-snow covered condition, the controller controls the light output of the second light source to be in a range from 1.1 to 2.6 times greater than the light output of the first light source.

4. The lighting device according to claim 3, wherein under the non-snow covered condition, the controller controls the light output of the second light source to be in a range from 2.4 to 2.6 times greater than the light output of the first light source when an illumination target of the lighting device includes at least an asphalt road surface.

5. The lighting device according to claim 3, wherein under the non-snow covered condition, the controller controls the light output of the second light source to be in a range from 1.1 to 1.3 times greater than the light output of the first light source when an illumination target of the lighting device includes at least a concrete road surface.

6. The lighting device according to claim 1, wherein the first light source and the second light source form combined light having an S/P ratio of 2.0 or greater.

7. The lighting device according to claim 1, further comprising a snow detector configured to detect whether or not snow cover is present, wherein the controller controls the output light of the second light source to be dim when the snow detector detects the presence of the snow cover.

8. The lighting device according to claim 1, further comprising a snow detector configured to detect whether or not snow cover is present, wherein the controller controls the output light of the second light source to turn off when the snow detector detects the presence of the snow cover.

9. The lighting device according to claim 7, wherein
the snow detector detects an amount of the snow cover, and
the controller dims the output light of the second light source as the amount of the snow cover, detected by the snow detector, increases.

10. The lighting device according to claim 1, further comprising an operation switch that is operable by a user, wherein the controller controls the output light of the second light source to turn off when the operation switch is operated.

11. The lighting device according to claim 1, further comprising an operation switch that is operable by a user, wherein the controller controls the output light of the second light source to be dim when the operation switch is operated.

12. The lighting device according to claim 1, wherein the first light source has a correlated color temperature of 4150 K or less.

* * * * *